United States Patent Office 3,829,504
Patented Aug. 13, 1974

3,829,504
NOVEL DI-LOWER ALKYL AND LOWER ALKYL-
ENE ACETALS OF 2- AND 3-PHENYL-PENTENALS
John B. Hall, Rumson, and Manfred Vock, West Orange,
N.J., assignors to International Flavors & Fragrances,
Inc., New York, N.Y.
No Drawing. Continuation-in-part of application Ser. No.
43,555, June 4, 1970, now Patent No. 3,694,232. This
application Aug. 1, 1972, Ser. No. 276,923
Int. Cl. C07c 41/10, 43/30
U.S. Cl. 260—611                                 4 Claims

ABSTRACT OF THE DISCLOSURE

Novel di-lower alkyl or lower alkylene acetals of 2- and 3-phenyl-pentenals useful in altering the aroma and/or organoleptic characteristics of foodstuff, foodstuff flavor and aroma, tobacco, tobacco flavor and aroma, perfume and perfumed compositions, and methods for preparing said acetals.

This application is a continuation-in-part of Application for United States Letters Patent No. 43,555, filed on June 4, 1970 now U.S. Pat. No. 3,694,232 issued on Sept. 26, 1972.

BACKGROUND OF THE INVENTION

The present invention relates to acetals of 2- or 3-phenyl-pentenals, which have been found to be useful in altering the flavor and/or aroma of consumable materials or act as precursors for free aldehydes which alter the flavor and/or aroma of consumable materials.

There has been considerable work performed relating to substances which can be used to impart flavors to various consumable materials. These substances are used to diminish natural materials some of which may be in short supply, and to provide more uniform properties in the finished product. Chocolate flavors, cinnamon flavors, vegetable flavors and hay-clover flavors are particularly desirable for many uses in consumable articles.

3-Phenyl-pentenals have been suggested in United States Patent Application Ser. No. 43,555, filed June 4, 1970 now U.S. Pat. No. 3,694,232 issued on Sept. 26, 1972 for use in cocoa flavors whereby notes characteristic of milk chocolate are provided. 3-Phenyl-4-pentenal is indicated to cause the chocolate beverage to have a fuller, richer sweet milk chocolate flavor. U.S. Pat. 3,582,360 issued on June 1, 1971 discloses certain 2-phenyl-2-alkenals as being useful for preparing flavoring compositions and food compositions, particularly those having chocolate or cocoa flavors and/or aroma qualities. Thus, for example, the compound 5-methyl-2-phenyl-2-hexenal is indicated therein to alter imitation cocoa flavor so as to provide a more natural cocoa flavor and impart a character of bitter chocolate.

Acetals are shown to be useful in fragrance formulations at Column 2, lines 50–65 of U. S. Pat. 3,636,113. Such acetals have the structures:

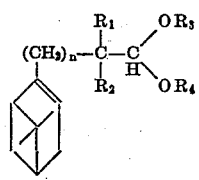

wherein $R_1$ and $R_2$ are either hydrogen or lower alkyl; wherein $R_3$ and $R_4$ are the same or different lower alkyl groups, and wherein $n$ is 1 or 2 and lower alkylene cyclic acetals having the structure

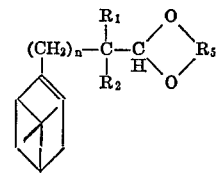

wherein $R_5$ is lower alkylene.

In United States Application Ser. No. 43,555 mentioned above, mention is made of the diethyl acetal of 3-phenyl-4-pentenal and the diethyl acetal of 3-phenyl-3-pentenal; but only as intermediates for producing 3-phenyl-3-pentenal and 3-phenyl-2-pentenal from 3-phenyl-4-pentenal.

In West et al. "Synthetic Perfumes: Their Chemistry and Preparation," published by Edward, Arnold & Co., London, England, in 1949, on page 315 cinnamaldehyde dimethyl acetal is stated to "have a fine cinnamon-cassia odor which renders it useful in some Chanel-like fancy perfume and in oriental types like Tabac Blond and Fleur de Tabac." Cinnamaldehyde diethyl acetal is also reported. These materials have the following structures:

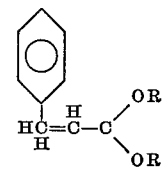

wherein R is methyl or ethyl.

Cinnamaldehyde diethyl acetal is reported in "Perfume and Flavor Chemicals (Aroma Chemicals)" by S. Arctander (published by the author in Montclair, N.J. 11969) as having a "faint but fresh green, slightly spicy, oily, sweet odor and a mild and oily sweet taste." Arctander goes on to state: "since this acetal—like most other acetals—is unstable under mildly acid conditions it finds little if any use in flavor compositions." In addition, Arctander also reports cinnamaldehyde 2,4-dihydroxy-4-methyl-pentane acetal as "soft, tenacious, natural, cinnamon type odor not nearly as harsh as cinnamic aldehyde yet rich and lasting as aldehyde itself." Cinnamic aldehyde dimethyl acetal is also reported by Arctander and with reference to this acetal Arctander states: "It should be noted that pure, aldehyde-free acetal is practically colorless and carries little or no odor similarly to the aldehyde." The ethylene glycol acetal of cinnamic aldehyde is indicated by Arctander to be useful in flavor compositions, such as allspice, cassia, cinnamon, clove and various spice blend and it is stated by Arctander to have a sweet spicy cinnamon allspice taste not quite as sweet as the aldehyde. It should be noted that cinnamic aldehyde ethylene glycol acetal is on the GRAS list and has been given F.E.M.A. No. 2287.

The cinnamic aldehyde acetals of the prior art are not considered to impart certain desired qualities to consumable materials which acetals of 2- and 3-phenyl-pentenals of this invention are capable of doing as more specifically described below.

The prior art cinnamic aldehyde acetal noted above, however, being unsaturated in a position $\alpha,\beta$- to the acetal moiety, are relatively unstable even in aqueous media.

THE INVENTION

It has now been discovered that solid and liquid foodstuff and flavoring compositions as well as novel aroma imparting compositions having rosy and/or sweet woody and/or cinnamon-like characteristics found in quality chocolate and cinnamon may be provided by the utilization of certain compounds of the class of di-lower alkyl or lower alkylene acetals of 2- and 3-phenyl pentenals. A number of acetals of this class will also provide sweet green vegetable and cooked tomato note flavors. Still other acetals of our invention, particularly 2- and 3-phenyl-2-pentenal lower alkyl and lower alkylene acetals and 3, 4 and 5 carbon lower alkyl and lower alkylene acetals of 2- and 3-phenyl-pentenals will act as precursors in forming corresponding free aldehydes which are themselves capable of imparting flavors, such as cinnamon or sweet milk chocolate flavors and nutty notes or cooked tomato and potato flavors or watermelon/cucumber notes to foodstuff; as well as cocoa aromas or green floral notes, as the case may be, to fragrance formulations. These "precursors" are uniquely useful in that they may be included, preferably, as part of a solid flavor or fragrance imparting composition which is capable of being stored for an indefinite period of time prior to use in a liquid foodstuff or in a perfume formulation or in a cologne. At the point of ultimate use of the flavor or fragrance imparting material such higher molecular weight acetal or such 2- or 3-phenyl-2-pentenal lower alkyl or lower alkylene acetal is hydrolyzed due to the presence of other acidic constituents and/or an aqueous medium and due to the liquid phase of the material in which it is used. In addition, it has been found that novel tobacco flavoring compositions having hay-clover-like qualities with fruity notes or excellent cinnamon aromas found in quality tobacco may be provided by the utilization of a number of compounds of the class of di-lower alkyl or lower alkylene acetals of 2- or 3-phenyl-pentenals. It has further been determined that novel fragrance compositions having imparted thereto green, rosy characteristics and/or green, balsamic, cinnamic notes found in quality floral perfume formulations may be provided by the utilization of a number of compounds of the class of di-lower alkyl or lower alkylene acetals of 2- or 3-phenyl-pentenals.

The terms "phenyl" and "pentenal" as used herein are intended to encompass both the substituted and unsubstituted derivatives. Thus, either of such moieties may contain one or more substituents, the salient requirement being that any such substituents be devoid of any tendency to deleteriously affect the functionality of the parent compound having reference to the ultimate environment contemplated, i.e., a foodstuff or flavoring composition. Thus, with respect to the phenyl moiety, suitable nuclear substituents include lower alkyl and/or lower alkoxy containing from 1 to 5 and preferably 1 to 3 carbon atoms. Moreover, such substituent groups may be present in amounts sufficient to provide either a partially or completely substituted phenyl ring. With respect to the carbon atoms comprising the pentenal chain, lower alkyl of 1 to 5 and preferably 1 to 3 carbon atoms are suitable.

Thus, the di-lower alkyl and alkylene acetals of 2- or 3-phenyl pentenals contemplated for use in the practice of the present invention can also, for convenience, be represented according to the following structural formula:

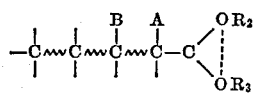

wherein one of A or B is of the structure:

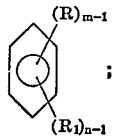

wherein R represents hydrogen or lower alkoxy containing from 1 to 5 carbon atoms, $R_1$ represents hydrogen or lower alkyl containing from 1 to 5 carbon atoms, $R_2$ and $R_3$ each represents the same or different lower alkyl containing from 1 up to 4 carbon atoms; or $R_2$ and $R_3$ taken together represents alkylene having from 2 up to 4 carbon atoms and $m$ and $n$ represent integers of 1 to 5 inclusive, their sum $(m+n)$ being from 2 to 7, and wherein one of the wavy lines represents a carbon to carbon double bond and the other two lines each represents a carbon to carbon single bond, the remaining valence of each carbon atom being satisfied by at least one member selected from hydrogen and lower alkyl of 1 to 5 carbon atoms. In the foregoing formula, the lower alkyl groups defined by $R_1$, $R_2$ and $R_3$ as well as the lower alkoxy group defined by R may be the same or different. Specific examples of compounds falling within the scope of the foregoing structural formula include, without necessary limitation, the following:

3-phenyl-3-pentenal dimethyl acetal
3-phenyl-3-pentenal ethyl methyl acetal
3-phenyl-2-pentenal diethyl acetal
3-phenyl-2-pentenal-1,3-propylene glycol acetal
3-phenyl-4-pentenal diethyl acetal
3-phenyl-4-pentenal dimethyl acetal
3-phenyl-4-pentenal ethyl propyl acetal
2-phenyl-4-pentenal dimethyl acetal
5-methyl-3-(4'-methylphenyl)-4-pentenal ethyl methyl acetal
3-(3',4',5'-trimethoxyphenyl)-3-pentenal methyl propyl acetal
3-phenyl-4-methyl-2-pentenal-1,2-butylene glycol acetal
3-(2',3',4',5'-tetramethylphenyl)-2-pentenal-2,3-butylene glycol acetal
3,4-dimethyl-3-phenyl-4-pentenal dipropyl acetal
2,3,4-trimethyl-3-(2',3',4'-triethoxyphenyl)-4-pentenal dibutyl acetal
3-(3'-methyl-4'-methoxyphenyl)-2-pentenal methyl propyl acetal
3-(3',4',5'-trimethylphenyl)-2-pentenal-1,2-propylene glycol acetal
3-(3',4',5'-trimethoxyphenyl)-4-pentenal-1, 4-butylene glycol acetal
3-(3'-ethyl-4',5'-dimethoxyphenyl)-3-pentenal ethylene glycol acetal
3-(2',5-dimethyl-3',4'-diethoxyphenyl)-4-pentenal diethyl acetal
3-(2',3',4',5'-tetramethylphenyl)-4-pentenal ethyl propyl acetal
3-(2',3'-diethoxy-4',5'-dimethoxyphenyl)-4-pentenal ethyl butyl acetal As will be apparent from the foregoing, the compounds described as di-lower acetals or lower alkylene glycol diacetals of 2- or 3-phenyl-pentenals may, in addition, be represented structurally as follows:

$$R_6-C \sim C \sim C \sim C-C \begin{matrix} B & A & OR_2 \\ | & | & \\ | & | & \\ R_5 & R_4 & R_7 & R_8 \end{matrix} \begin{matrix} OR_2 \\ OR_3 \end{matrix}$$

wherein one of A or B is a moiety having the structure wherein $R_4$, $R_5$, $R_6$, $R_7$ and $R_8$ are hydrogen or the same or different lower alkyl; wherein $R_{10}$, $R_{11}$, $R_{12}$, $R_{13}$ and $R_{14}$ are hydrogen or the same or different lower alkyl or the same or different lower alkoxy; wherein $R_2$ and $R_3$ are separately each $C_1$–$C_4$ lower alkyl or $R_2$ and $R_3$, taken together, is a lower alkylene moiety having from 2 up to 4 carbon atoms; and wherein the wavy lines have the significance previously explained.

As stated previously, the acetal derivatives of 2- or 3-phenyl-pentenals described herein are capable of supplying, inter alia, certain flavor and aroma notes usually lacking in many chocolate, cocoa, vegetable and cinnamon food flavoring materials and tobacco materials heretofore provided; thus, the latter materials provided prior to our discovery characteristically may yield chocolate flavors and aromas which may be characterized as "thin" and "harsh" or may simply have "nutty" or "milk chocolate" notes without the nuances which lend natural notes or cinnamon notes to chocolate or cocoa flavors. By way of contrast, the acetal derivatives of the 2- and 3-phenylpentenals of the present invention provide, inter alia organoleptic impressions similar to those which are achieved by the addition of natural cinnamon and/or ionone materials and/or natural damascone to chocolate flavors.

Particularly preferred for use herein are the lower alkyl acetals of 3-phenyl-pentenal compounds covered by the foregoing formula wherein each of the valences present in the carbon atoms of the pentenal chain, apart from those necessary to provide single or double bonds, is satisfied by hydrogen and wherein $m$ and $n$ is each one. Such compounds are represented as follows:

3-phenyl-4-pentenal dialkyl acetals or alkylene acetals

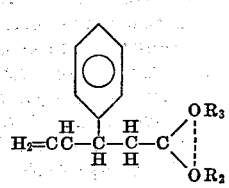

3-phenyl-3-pentenal dialkyl acetals or alkylene acetals

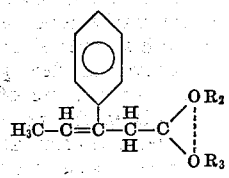

3-phenyl-2-pentenal dialkyl acetals or alkylene glycol acetals

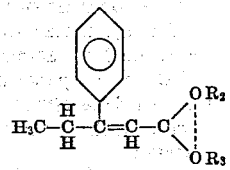

(wherein $R_2$ and $R_3$ are defined as above).

Examples of food flavor, fragrance, and tobacco flavor properties of the di-lower alkyl and lower alkylene phenyl pentenal acetals which are preferred in the practice of the instant invention are as follows:

1. The dimethyl acetal of 3-phenyl-4-pentenal

Aroma: Cassia, cinnamon spice-like, with a "fresh green" balsamic nuance.
Taste: at 5 p.p.m. has a rosy, cinnamon taste. At 10 p.p.m. has a cinnamon spice-like flavor with root-like backnotes. At 20 p.p.m. has dominating cinnamon notes.
Tobacco: at a level of ⅛ of 1% imparts a cinnamon powder aroma.

2. The dimethyl acetal of 2-phenyl-4-pentenal

Aroma: A low keyed greenish note having additional nuances which can be described as hay-like, moiety, floral, spicy and having an initial impact of fruity and apple seed aromas.
Taste: At 2 p.p.m. and 5 p.p.m. has a sweet green vegetable low floral and cooked tomato taste. At 10 p.p.m. the taste is more turnip-like. At 1 p.p.m. has a slight green spicy character.

3. The diethyl acetal of 3-phenyl-4-pentenal

Aroma: Green, balsamic, cinnamon-like spiciness.
Taste: At 10 p.p.m. has weak rosy notes and a slightly spice-like character with a sweet fruity nuance. Can also be described as having a cinnamon-like character.
Tobacco: At a level of ⅛% imparts to tobacco a hay-clover-like aroma with fruity notes.

4. The diisobutyl acetal of 3-phenyl-4-pentenal

Aroma: A low-keyed greenish note.

5. The ethylene glycol acetal of 3-phenyl-4-pentenal

Aroma: Warm sweet cinnamon-spice-like and low keyed green notes with an earthy nuance reminiscent of clovers.
Taste: At 10 p.p.m. has a slight spice-like character reminiscent of cinnamon or clovers. At 1 and 2 p.p.m. has a pleasant cinnamon bark taste. At 5 p.p.m. has a cinnamon/clover taste. At 30 p.p.m. has a sweet, fruity, and note-like taste with mild pungency.

6. The dimethyl acetal of 3-phenyl-3-pentenal

Aroma: Has a low-keyed green cinnamon note.

Examples of food flavor properties of aldehydes (listed below) for which certain acetals of this invention (also listed below) are precursors in aqueous or slight acidic (e.g. pH of from 3 up to 7) solution are set forth below:

| Acetal precursor | Free aldehyde | Flavor properties of free aldehydes |
|---|---|---|
| 4-methyl-2-phenyl-2-pentenal diethyl acetal. | 4-methyl-2-phenyl-2-pentenal. | Provides green pungent cocoa flavoring note. |
| 4-methyl-2-phenyl-2-pentenal diisobutyl acetal. | ----do---- | Do. |
| 4-methyl-2-phenyl-2-hexenal diethyl acetal. | 4-methyl-2-phenyl-2-hexenal. | Do. |
| 4-methyl-2-phenyl-2-hexenal diisobutyl acetal. | ----do---- | Do. |
| 5-methyl-2-phenyl-2-hexenal diethyl acetal. | 5-methyl-2-phenyl-2-hexenal. | Do. |
| 5-methyl-2-phenyl-2-hexenal diisobutyl acetal. | ----do---- | Do. |
| 5-methyl-2-(2,6-dimethylphenyl)-2-hexenal diethyl acetal. | 5-methyl-2-(2,6-dimethylphenyl)-2-hexenal diethyl acetal. | Do. |
| 5-methyl-2-(2,6-dimethylphenyl)-2-hexenal diisobutyl acetal. | 5-methyl-2-(2,6-dimethylphenyl)-2-hexenal. | Do. |
| 5-methyl-2-(2,4-dimethylphenyl)-2-hexenal diethyl acetal. | 5-methyl-2-(2,4-dimethylphenyl)-2-hexenal. | Do. |
| 5-methyl-2-(2,4-dimethylphenyl)-2-hexenal diisobutyl acetal. | ----do---- | Do. |
| 5-methyl-2-(3,5-dimethylphenyl)-2-hexenal diethyl acetal. | 5-methyl-2-(3,5-dimethylphenyl)-2-hexenal. | Do. |
| 5-methyl-2-(3,5-dimethylphenyl)-2-hexenal diisobutyl acetal. | ----do---- | Do. |
| 5-methyl-2-(4-methylphenyl)-2-hexenal diethyl acetal. | 5-methyl-2-(4-methylphenyl)-2-hexenal. | Do. |
| 5-methyl-2-(4-methylphenyl)-2-hexenal diisobutyl acetal. | ----do---- | Do. |
| 5-methyl-2-(isopropylphenyl)-2-hexenal diethyl acetal. | 5-methyl-2-(isopropylphenyl)-2-hexenal. | Do. |
| 5-methyl-2-(isopropylphenyl)-2-hexenal diisobutyl acetal. | ----do---- | Do. |
| 3-phenyl-4-pentenal diisobutyl acetal. | 3-phenyl-4-pentenal. | Sweet milk chocolate. |

Examples of food flavor properties of aldehydes (listed below) for which certain acetals of this invention (also listed below) are precursors in aqueous or slight acidic (e.g. pH of from 3 up to 7) solution are set forth below:

| Acetal precursor | Free aldehyde | Flavor properties of free aldehydes |
|---|---|---|
| 4-methyl-2-phenyl-2-pentenal diethyl acetal. | 4-methyl-2-phenyl-2-pentenal. | Provides green pungent cocoa flavoring note. |
| 4-methyl-2-phenyl-2-pentenal diisobutyl acetal. | .....do..................... | Do. |
| 4-methyl-2-phenyl-2-hexenal diethyl acetal. | 4-methyl-2-phenyl-2-hexenal. | Do. |
| 4-methyl-2-phenyl-2-hexenal diisobutyl acetal. | .....do..................... | Do. |
| 5-methyl-2-phenyl-2-hexenal diethyl acetal. | 5-methyl-2-phenyl-2-hexenal. | Do. |
| 5-methyl-2-phenyl-2-hexenal diisobutyl acetal. | .....do..................... | Do. |
| 5-methyl-2-(2,6-dimethylphenyl)-2-hexenal diethyl acetal. | 5-methyl-2-(2,6-dimethylphenyl)-2-hexenal diethyl acetal. | Do. |
| 5-methyl-2-(2,6-dimethylphenyl)-2-hexenal diisobutyl acetal. | 5-methyl-2-(2,6-dimethylphenyl)-2-hexenal. | Do. |
| 5-methyl-2-(2,4-dimethylphenyl)-2-hexenal diethyl acetal. | 5-methyl-2-(2,4-dimethylphenyl)-2-hexenal. | Do. |
| 5-methyl-2-(2,4-dimethylphenyl)-2-hexenal diisobutyl acetal. | .....do..................... | Do. |
| 5-methyl-2-(3,5-dimethylphenyl)-2-hexenal diethyl acetal. | 5-methyl-2-(3,5-dimethylphenyl)-2-hexenal. | Do. |
| 5-methyl-2-(3,5-dimethylphenyl)-2-hexenal diisobutyl acetal. | .....do..................... | Do. |
| 5-methyl-2-(4-methylphenyl)-2-hexenal diethyl acetal. | 5-methyl-2-(4-methylphenyl)-2-hexenal. | Do. |
| 5-methyl-2-(4-methylphenyl)-2-hexenal diisobutyl acetal. | .....do..................... | Do. |
| 5-methyl-2-(isopropylphenyl)-2-hexenal diethyl acetal. | 5-methyl-2-(isopropylphenyl)-2-hexenal. | Do. |
| 5-methyl-2-(isopropylphenyl)-2-hexenal diisobutyl acetal. | .....do..................... | Do. |
| 3-phenyl-4-pentenal diisobutyl acetal. | 3-phenyl-4-pentenal....... | Sweet milk chocolate. |

As used herein in regard to flavors, the term "alter" in its various forms means supplying or imparting a flavor character or note to an otherwise bland, relatively tasteless substance, or augmenting the existing flavor characteristic where a natural flavor is deficient in some regard, or supplementing the existing flavor impression to modify its quality, character or taste.

As used herein the term "foodstuff" includes both solid and liquid ingestible materials which usually do, but need not, have nutritional value. Thus, foodstuffs include meats, gravies, soups, convenience foods, beverages, dairy products, candies, vegetables, cereals, soft drinks, snacks and the like.

In many instances the optimum balance of flavor is obtained by utilizing mixtures of compounds wherein at least one component comprises an unsubstituted lower alkyl or di-lower alkyl acetal of a 2- or 3-phenyl-pentenal, i.e., contains no substituents on either the pentenal chain or the phenyl moiety; a second component comprises an unsubstituted 2- or 3-phenyl-pentenal; and a third component comprises at least one substituted di-lower alkyl acetal derivative of a 2- or 3-phenyl-pentenal, i.e., an alkyl and/or alkoxy phenyl group. Other mixtures may also include another type of phenyl alkenyl, e.g. a 2-phenyl-alkenyl used to, in addition, supply a nutty note. Such mixtures may comprise, for example, the dimethyl acetal of 3-phenyl-4-pentenal; the free aldehyde 3-phenyl-pentenal; and the methyl ethyl acetal of 3-(4'-methylphenyl)-4-pentenal and/or the dimethyl acetal of 3-(4'-methoxyphenyl)-4-pentenal. When mixtures of the acetals of the 2- or 3-phenyl-pentenal taken together with other phenyl pentenal are used, their proportions with one another can be varied as desired to suit the particular foodstuff to be flavored and will depend upon whether the composition so formulated is utilized to supply a total organoleptic impression or to enhance or fortify an existing flavor and/or aroma characteristics. It has been found when preparing cinnamon, chocolate, and cocoa flavors, for example, that a good blend is obtained by using a mixture of about 10–20% of a di-lower alkyl acetal of at least one unsubstituted 3-phenyl-pentenal, e.g. 3-phenyl-4-pentenal dimethyl acetal; about 2–5% of a 3-phenyl-pentenal free aldehyde, e.g., 3-phenyl-4-pentenals; about 40–50% of at least one 2- or 3-phenyl-pentenal dialkyl acetal having alkyl and/or alkoxy substituents on the phenyl group, e.g., 3-(2',4',6'-trimethoxyphenyl)-4-pentenal diethyl acetal, 3-(2',3',4'-trimethylphenyl)-3-pentenal diethyl acetal and/or 4-methyl-3-phenyl-2-pentenal 1,3-propylene glycol acetal; about 10–20% of at least one trialkyl substituted 3-phenyl pentenal lower di-alkyl or lower alkenyl acetal, e.g., 3-methyl-3-(2',4'-dimethyl-phenyl)-4-pentenal 1,2-butylene glycol acetal, 4-methyl-3-(2',4'-dimethylphenyl)-2-pentenal ethyl propyl acetal and/or 4-ethyl-3-(2',4'-methylphenyl-2-pentenal dipropyl acetal, and about 20–30% of at least one tetraalkyl 3-phenyl pentenal lower dialkyl or lower alkylene acetal, e.g., 3-methyl-3-(2',4',6'-trimethylphenyl)-4-pentenal diethyl acetal. It will be understood that these ratios can be varied to supply, enhance, modify or fortify the flavor of the foodstuff or flavoring composition.

The dialkyl and lower alkylene acetals of 3-phenyl pentenals contemplated for use in the practice of this invention can be synthesized by first reacting an appropriately substituted or unsubstituted 3-phenyl-propen-2-ol-1 and an appropriately substituted or unsubstituted alkyl vinyl ether. The reaction can take place using as a catalyst a protonic acid (such as phosphoric acid) thus forming, in one step, 3-phenyl-4-pentenal. The desired intermediate products can also be obtained using the aforementioned reactants but using a mercuric catalyst such as mercuric acetate (in place of the acid catalyst). Such a procedure is also described by Burgstahler *J. Chem. Soc.*, 1963, pages 4986–9 [see paragraph 2 on page 4989]. In addition, another such procedure is described in co-pending U.S. Pat. Application Ser. No. 43,555, filed on June 4, 1970. If the 3-phenyl-4-pentenals are produced according to the abovementioned procedures, the di-lower alkyl or lower alkylene acetals are preferably produced therefrom by reacting such mixtures with a lower alcohol or mixture of lower alcohols or with a lower alkylene glycol or mixture of lower alkylene glycols or mixture of lower alcohols and lower alkylene glycols in the presence of an acid catalyst such as paratoluene sulfonic acid, hydrochloric acid or a source therefor, such as acetyl chloride. 2- or 3-phenylpentenals (free aldehydes) may also be converted to the corresponding acetals by reaction with an appropriate orthoformate. Thus, for example, reaction of tri-ethyl orthoformate with 3-phenyl-4-pentenal will give rise to the production of a good yield of the diethyl acetal of 3-phenyl-4-pentenal. Dialkyl acetals of 2- or 3-phenyl-pentenals may also be formed by admixing the free aldehydes with such 2,1-dialkoxy propanes as 2,2-dimethoxy propane. Mixtures of an alkylene glycol such as ethylene glycol and an orthoformate such as triethyl orthoformate give rise to alkylene acetals.

In addition, when producing the aldehydes prior to the reaction with alcohol or with the orthoformate to form the acetal, if only 3-phenyl-4-pentenals are formed then the carbon-carbon double bond in the pentenal moiety of the 3-phenyl-4-pentenal intermediate product, if desired, may be rearranged whereby the end product will turn out to be an acetal of a given 3-phenyl-3-pentenal. Thus, initially, the aldehyde moiety may be "stabilized" by treatment of the 3-phenyl-4-pentenal with an alcohol or a glycol such as methanol, ethanol, 1,2-propylene glycol, 1-3-propylene glycol, 1,2-butylene glycol, 1,3-butylene glycol, 1,4-butylene glycol, 2-methyl-1,3-propane diol or ethylene glycol. The resulting acetal of 3-phenyl-4-pentenal may then be retained and used as a tobacco, food flavor or fragrance adjuvant or it is treated with a base such as potassium t-butoxide whereby a 3-phenyl-3-pentenal acetal is formed. The resultant rearranged acetals may then, if desired, be purified by means of appropriate extraction and distillation so that they are usable as food flavor, fragrance or tobacco flavor adjuvants. The aforementioned reaction sequence is illustrated as follows:

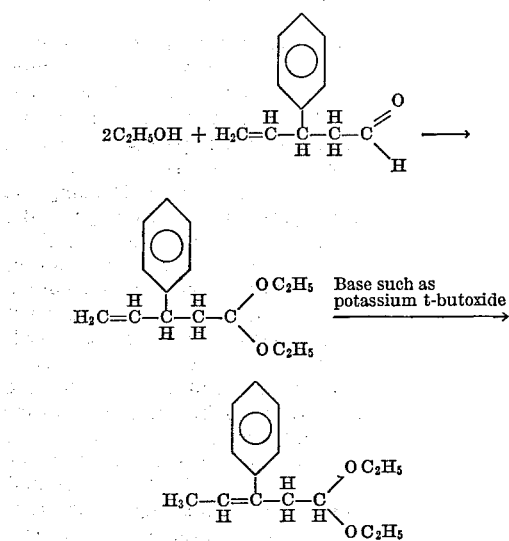

More particularly after they are produced in the aforementioned manner (e.g. as the 3-phenyl-4-pentenal mixtures or as the 3-phenyl-4-pentenals produced as indicated above or the alkyl and/or alkoxy substituted derivatives thereof), these free aldehydes are then reacted with a low alcohol, or a mixture of lower alcohols or a lower alkylene glycol or a mixture of such glycols or a mixture of one or more lower alcohols and glycols in the presence of an acidic medium, for example, in the presence of hydrogen chloride or in the presence of a source of hydrogen chloride, such as acetyl chloride. If only 3-phenyl-4-pentenal di-lower alkyl acetals or lower alkylene glycol acetals are formed, such materials may be desired to be partially or entirely rearranged to 3-phenyl-3-pentenal di-lower alcohols or lower alkylene glycol acetals. Predictable mixtures of 3-phenyl-3-pentenal acetals and 3-phenyl-4-pentenal acetals may be produced if desired by shortening the time of reaction by means of prematurely neutralizing the base (e.g. potassium-t-butoxide) which is present in the reaction mass.

The preparation of 3-phenyl-2-pentenal di-lower alkyl acetals and lower alkylene acetals is most preferably carried out by (1) first forming the 3-phenyl-2-pentenal by means of reaction of propiophenone with the lithium salt of a Shiff base of acetaldehyde (e.g. a Shiff base of acetaldehyde with cyclohexylamine) thereby forming a 3-phenyl-2-pentenal Shiff base. This Shiff base is then hydrolyzed thus forming the 3-phenyl-2-pentenal (free aldehyde) which is then reacted with a suitable orthoformate and in addition a lower alcohol or a mixture of different lower alcohols or a lower alkylene glycol or a mixture of lower alkylene glycols or a mixture of alcohols and lower alkylene glycols in the presence of an acidic reaction promoter, thus forming one or a mixture of the lower acetals and/or alkylene glycol acetals useful in our invention. The reaction sequence is illustrated as follows:

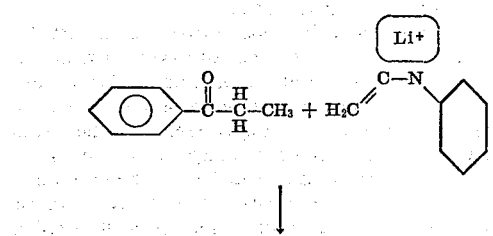

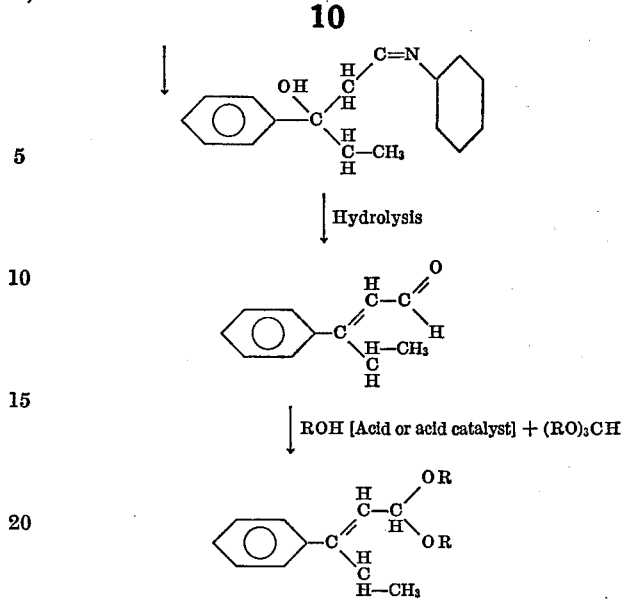

wherein R is lower alkyl, e.g. methyl, ethyl, propyl or butyl.

2-Phenyl-2-pentenal dialkyl acetals and alkylene glycol acetals of this invention are prepared by first preparing the 2-phenyl-2-pentenals according to any of the processes set forth in the U.S. Pat. 3,582,360 issued on June 1, 1971 whereby the free aldehydes are produced; followed by reacting such free aldehydes with a suitable orthoformate and in addition a desired lower alcohol or lower alkylene glycol in the presence of an acid such as para-toluene sulfonic acid, aqueous hydrochloric acid, dry HCl gas or acetyl chloride. An illustration of this reaction is the production of the diethyl acetal of 5-methyl-2-(dimethylphenyl)-2-hexenal according to the following reaction sequence:

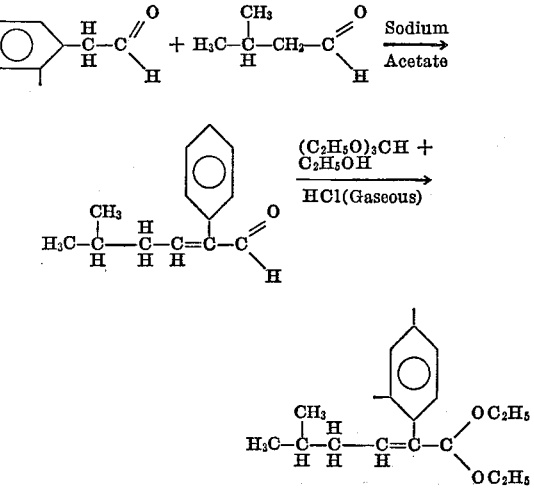

2-Phenyl-4-pentenal dialkyl acetals and alkylene glycol acetals of this invention are prepared by first preparing the 2-phenyl-4-pentenal free aldehydes. These free aldehydes are prepared by first forming the enamine of morpholine and phenylacetaldehyde. The resulting enamine is then reacted with an allyl halide (such as allyl chloride or allyl bromide whereby the allyl moiety is added to the alpha-carbon atom of the enamine; and an immonium salt is formed. Addition of the allyl halide is carried out in the presence of a solvent preferably acetonitrile and in the absence of any catalyst or in the presence of a potassium or sodium iodide catalyst. Both the reaction to form the enamine of phenylacetaldehyde and the reaction to form the immonium salt are carried out at reflux conditions. The resulting immonium salt is then hydrolyzed whereby the free aldehyde, the 2-phenyl-4-pentenal is produced.

The free aldehydes are then converted to the corresponding dilower alkyl or lower alkylene acetals by reaction with a lower alcohol or mixture of lower alcohols or with a lower alkylene glycol or mixture of lower alkylene glycols or mixture of lower alcohols and lower alkylene glycols in the presence of an acid catalyst, such as paratoluene sulfonic acid, hydrochloric acid or source therefor, such as acetyl chloride. The 2-phenyl-4-pentenals may also be converted to the corresponding acetals by reaction of an appropriate orthoformate. Thus, for example, the reaction of ethyl orthoformate with 2-phenyl-4-pentenal will give rise to the production of a good yield of the diethyl acetal of 2-phenyl-4-pentenal.

The aforementioned reaction sequence is illustrated as follows:

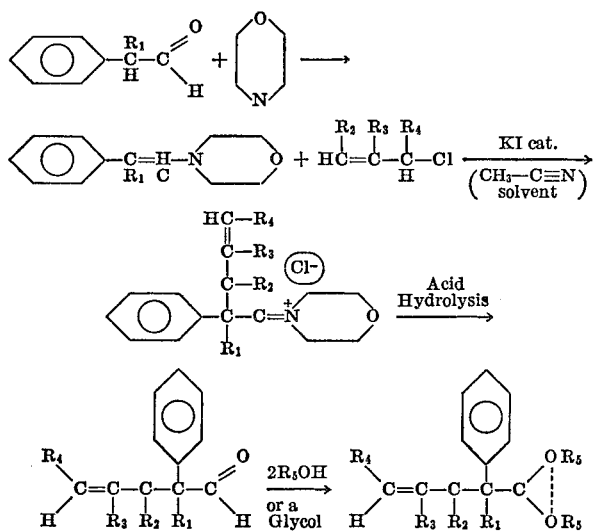

wherein $R_1$, $R_2$, $R_3$ and $R_4$ are $C_1$–$C_3$ lower alkyl and $R_5$ is lower alkyl or forms an alkylene glycol acetal ring.

When the materials of this invention, the lower alkyl diacetals and lower alkylene acetals of 2- or 3-phenyl-pentenals are used as food flavor adjuvants, the nature of the co-ingredients included with the 2- or 3-phenyl-pentenal lower dialkyl acetals or lower alkylene acetals in formulating the product composition will, i.e., as a foodstuff per se or alternatively as a flavoring composition adapted to be added to a foodstuff at some subsequent point of time. In any event, such compounds serve to alter the organoleptic characteristics of the ultimate foodstuff treated therewith.

Substances suitable for use herein as co-ingredients or flavoring adjuvants are well known in the art for such use being extensively described in the relevant literature. Apart from the requirement that any such material be "ingestibly" acceptable, and thus non-toxic or otherwise non-deleterious, nothing particularly critical resides in the selection thereof. Accordingly, such materials, which may in general be characterized as flavoring adjuvants or vehicles comprise broadly, stabilizers, thickeners, surface active agents, conditions, flavorants and flavor intensifiers.

Stabilizer compounds include preservatives, e.g., sodium chloride, antioxidants, e.g., calcium and sodium ascorbate, ascorbic acid, butylated hydroxyanisole (mixture of 2 and 3 tertiary butyl-4-hydroxyanisole), butylated hydroxy toluene (2,6-di-tertiary-butyl-4-methyl phenol), propyl gallate and the like, sequestrants, e.g., citric acid.

Thickener compounds include carriers, binders, protective colloids, suspending agents, emulsifiers and the like, e.g., agar-agar; carrageenan; cellulose and cellulose derivatives such as carboxymethyl cellulose and methyl cellulose; natural and synthetic gums such as gum arabic, gum tragacanth; gelatin, proteinaceous materials; lipids; carbohydrates; starches pectins, and emulsifiers, e.g., mono- and diglycerides of fatty acids, skim milk powder, hexoses, pentoses, disaccharides, e.g., sucrose, corn syrup solids and the like.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, turmeric and curcuma and the like; firming agents such as aluminum sodium sulfate, calcium chloride and calcium gluconate; texturizers; anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like.

Flavorants and flavor intensifiers include organic acids, e.g., fatty saturated acids, unsaturated acids and amino acids; alcohols, e.g., primary and secondary alcohols; esters, carbonyl compounds including aldehydes and ketones as well as lactones; cyclic organic materials including benzene derivatives; isocyclics; heterocyclics such as furans, particularly 3-acetyl furan, pyridines, pyrazines (particularly monoalkyl, dialkyl, trialkyl and tetraalkyl substituted pyrazines) and the like, sulfur-containing materials including thiazoles, disulfides, thiols, sulfides, aldehydes, (for example, 3-phenyl - 4 - pentenal, 3-phenyl-3-pentenal, 3 - phenyl - 2 - pentenal, 2 - phenyl - 2 - pentenal, and 2-phenyl-3-methyl-2-butenal; disulfides and the like; so-called flavor potentiators such as monosodium glutamate, guanylates, inosinates, natural and synthetic flavorants such as vanillin, ethyl vanillin, diacetyl, phenethyl 2-furoate, maltol, natural gums and the like; spices, herbs, essential oils and extractives including "bitterness principles" such as theobromin, caffein, naringin and other suitable materials creating a bitter effect.

The specific flavoring adjuvant selected from use may be either solid or liquid, depending upon the desired physical form of the ultimate product, i.e., foodstuff, whether simulated or natural, and should, in any event, be capable of providing an environment in which the 2- or 3-phenyl-pentenal di-lower alkyl acetals or lower alkylene acetals can be dispersed or admixed to provide a homogeneous medium. In addition, selection of one or more flavoring adjuvants as well as the quantities thereof will depend upon the precise organoleptic character desired in the finished product; thus, in the case of flavoring compositions, ingredient selection will vary in accordance with the foodstuff to which the flavor and aroma are to be imparted. In contradistinction, in the preparation of solid products, e.g., simulated foodstuffs, ingredients capable of providing normally solid compositions should be selected such as various cellulose derivatives.

As will be appreciated by those skilled in the art, the amount of 2- or 3-phenyl-pentenal di-lower alkyl acetals or lower alkylene acetals employed in a particular instance can vary over a relatively wide range whereby to achieve desired organoleptic effects having reference to the nature of the product. All parts and percentages given herein are by weight unless otherwise specified. Thus, correspondingly greater amounts would be necessary in those instances wherein the ultimate food composition to be flavored is relatively bland to the taste, whereas relatively minor quantities may suffice for purposes of enhancing a composition merely deficient in natural flavor or aroma. Thus, the primary requirement is that the amount selected be effective, i.e., sufficient to alter the organoleptic characteristics of the parent composition, whether foodstuff per se or flavoring composition. Thus, the use of insufficient quantities of the 2- or 3-phenylpentenal di-lower alkyl acetals or lower alkylene acetals will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded as significance in the context of the present invention consistent with the obtention of desired flavoring effects.

Thus, and with respect to ultimate food compositions, it is found that quantities of 2- or 3-phenyl-pentenal di-lower alkyl acetals or lower alkylene acetals ranging from a small but effective amount, e.g., 1.0 part per million up to about 200 parts per million by weight based on total composition are suitable. Concentrations in excess of the maximum quantities stated are not normally recommended since they fail to provide commensurate enhancement of organoleptic properties. In those instances wherein the 2- or 3-phenyl-pentenal di-lower alkyl acetals or lower alkylene acetals is added to the foodstuff as an integral component of a flavoring composition, it is, of course, essential that the total quantity of flavoring composition employed be sufficient to yield an effective 2- or 3-phenyl-pentenal di-lower alkyl acetals or lower alkylene acetals concentration in the foodstuff product.

Food flavoring compositions prepared in accordance with the present invention preferably contain the 2- or 3-phenyl-pentenal di-lower alkyl acetals or lower alkylene acetals in concentrations ranging from about 20% to 100% by weight, based on the total weight of said flavoring composition.

The compositions described herein can be prepared according to conventional techniques well known in the art for such purposes. Thus, liquid products as typified by cake batters egg nog and chocolate milk can be formulated by merely admixing the involved ingredients within the proportions stated in a suitable blender to obtain the desired consistency, homogeneity of dispersion, etc. Alternatively, flavoring compositions in the form of particulate solids can be conveniently prepared by admixing the 2- or 3-phenyl-pentenal di-lower alkyl acetals or lower alkylene acetals with, for example, gum arabic, gum tragacanth, carrageenin and the like, and thereafter, spray-drying the resultant mixture whereby to obtain the particulate solid product. Pre-prepared flavor mixes in powder form e.g., cocoa mix may be obtained by mixing the dried solid components e.g., milk solids, sugar and the like and 2-, 3-, or 4-phenyl-pentenal di-lower alkyl acetals or lower alkylene acetals in a dry blender until the requisite degree of uniformity is achieved.

It is presently preferred to combine with the 2- or 3-phenyl pentenal di-lower alkyl acetals or lower alkylene acetals the following flavoring adjuvants: Vanillin, Maltol, Benzaldehyde and Isovaleraldehyde.

2- or 3-phenyl-pentenal di-lower alkyl acetals and lower alkylene acetals according to this invention can also be used to improve and augment the organoleptic properties of tobacco and tobacco products. Thus, for example, 3-phenyl - 4 - pentenal di-ethyl acetal will impart a desired hay clover-like flavor with fruity notes to a standard clover flavor used in tobacco. Tobacco, as used herein, includes natural tobaccos, such as burley, Turkish tobacco, Maryland tobacco; tobacco-like products, such as reconstituted tobacco of homogenized tobacco; and tobacco substitutents intended to replace natural tobacco such as various vegetable leaves, for example, lettuce and cabbage leaves and the like.

A 2- or 3-phenyl-pentenal di-lower alkyl acetal or lower alkylene acetal of this invention and an auxiliary perfume ingredient, including, for example, alcohols, aldehydes, nitriles, esters, cyclic ethers, and natural essential oils, which are admixed so that the combined odors of the individual components produce a pleasant or desired fragrance. Such perfume compositions usually contain (a) the main note or the "bouquet" or foundation stone of the composition; (b) modifiers which round off and accompany the main note; (c) fixatives which include odorous substances which lend a particular note to the perfume throughout all stages of evaporation and substances which retard evaporation; and (d) top notes which are usually low boiling fresh smelling materials.

In perfume compositions the individual component will contribute its particular olfactory characteristics, but the overall effect of the perfume composition will be the sum of the effects of each of the ingredients. Thus, the individual compounds of this invention, or mixtures thereof, can be used to alter the aroma characteristics of a perfume composition, for example, by utilizing or moderating the olfactory reaction contributed by another ingredient in the composition.

The amount of the acetal compound of this invention which will be effective in perfume compositions depends in many factors, including the other ingredients, their amounts and the effects which are desired. It has been found that perfume compositions containing as little as 1% of the compounds of this invention or even less, can be used to impart a scent odor to soaps, cosmetics, and the other products. The amount employed can range up to 5% of the fragrance components and will depend on considerations of cost, nature of the end product, the effect desired on the finished product and the particular fragrance sought.

The 2- and 3-phenyl-pentenal di-lower alkyl acetals and lower alkylene acetals of this invention are useful in a perfume composition as an olfactory component in detergents and soaps; space odorants and deodorants; perfumes; colognes; toilet waters; bath preparations, such as bath oils and bath solids; hair preparations, such as lacquers, brilliantines, pomades and shampoo; cosmetic preparations, such as creams, deodorants, hand lotions, and sun screens; powders, such as talcs, dusting powders, face powders and the like. When used as an olfactory component of a perfumed article, as little as 100 p.p.m. of one or more of the preferred acetals of this invention will suffice to impart either a green, balsamic, cinnamic-like character to the topnote of the fragrance employed or a green, rosy character to the topnote of the fragrance employed or a green, rosy note to the body of the fragrance employed. Generally, no more than 0.5% of the acetals of this invention based on the ultimate end product is required in the perfume composition.

In addition, the perfume composition or fragrance composition of this invention can contain a vehicle or carrier for the acetals alone or with other ingredients. The vehicle can be a liquid such as an alcohol, non-toxic alcohol, non-toxic glycol, or the like. The carrier can also be an absorbent solid, such as a gum (e.g. gum arabic) or components for encapsulating the composition (such as gelatin).

It will thus be apparent that the acetals according to the present invention can be utilized to alter the sensory property, particularly organoleptic properties, such as flavor and/or fragrance of a wide variety of consumable materials.

The following Examples are given to illustrate embodiments of the invention as it is presently preferred to practice it. It will be understood that these Examples are illustrative, and the invention is not to be considered as restricted thereto except as indicated in the appended claims.

EXAMPLE I

Preparation of 3-phenyl-4-pentenal dimethyl acetal 18 grams of 3-phenyl-4-pentenal produced according to the procedure Burgstahler J. Chem. Soc. 1963, pages 4986–90 is admixed with 16 grams of Linde 3A molecular sieves 1/16" pellets purchased from the Matheson, Coleman & Bell Co., East Rutherford, New Jersey, and combined with 115 ml. of anhydrous methanol. In a separate flask 1 ml. of acetyl chloride is dissolved in 8 ml. of methanol whereby an HCl-methanol solution is formed. The resulting HCl solution is then added to the 3-phenyl-4-pentenal solution (total volume: 125 ml.). After a period of two hours, the resultant reaction mixture is decanted from the molecular sieves, evaporated and distilled at a pressure of 0.5 mm. Hg and a temperature in the range of 72–73° C. The distillate is 3-phenyl-4-pentenal dimethyl acetal.

The NMR data is as follows:

| P.p.m. | | Interpretation |
|---|---|---|
| 7.20 | (m) 5H | Aryl protons. |
| 6.20–5.76 | (m) 1H | Olefinic proton. |
| 5.10–4.94 | (m) 2H | Olefinic protons. |
| 4.21 | (t) 1H | Acetal proton. |
| 3.44–3.24 | (m) 7H | Protons α to oxygen and aryl—C$\underline{H}$— |
| 1.98 | (t) 2H | Aryl—C—C$\underline{H}_2$ |

EXAMPLE II

Preparation of 3-phenyl-3-pentenal dimethyl acetal 15 grams of the 3-phenyl-4-pentenal dimethyl acetal produced in the immediately preceding Example is dissolved in dimethyl sulfoxide (total volume 50 ml.) and 1.5 grams of potassium-t-butoxide is added. The mixture is then stored at room temperature under a nitrogen blanket for a period of 1½ hours. The reaction mass is then diluted with 50 cc. of water and is extracted with two 100 ml. portions of diethyl ether. The diethyl ether extract is dried over anhydrous sodium sulfate and evaporated down. The resulting residue contains a 2:1 mixture of 3-phenyl-3-pentenal dimethyl acetal and 3-phenyl-4-pentenal dimethyl acetal. The resulting mixture is then retreated with potassium-t-butoxide in dimethyl sulfoxide and again worked up as above. Removal of solvent yields 14.9 grams of a quite mobile orange oil. The reaction produced is distilled at 83° C. and 0.1 mm. Hg pressure in a concentric tube distillation apparatus, yielding 3-phenyl-3-pentenal dimethyl acetal.

The NMR data for this compound is as follows:

| P.p.m. | | Interpretation |
|---|---|---|
| 7.40–7.20 | (m) 5H | Aryl protons. |
| 5.80 | (q) 1H | Aryl—$\overset{H}{\underset{\|}{C}}$=C—CH$_3$ |
| 4.33 | (t) 1H | Acetal proton. |
| 3.24 | (s) 6H | CH$_3$—O— |
| 2.83 | (d) 2H | Aryl—$\overset{H}{C}$—C$\underline{H}_2$—O— |
| 1.82 | (d) 3H | C=$\overset{H}{C}$—C$\underline{H}_3$ |

EXAMPLE III

Preparation of 3-phenyl-2-pentenal

Into a 100 ml. flask the following ingredients are added:

| Ingredients: | Quantity, ml. |
|---|---|
| Piperidine | 10.0 |
| Diethyl ether | 10.0 |

62.5 ml. of a 1.6 N butyl lithium solution in hexane is added dropwise. After the addition 12.5 grams of the Schiff base of acetaldehyde and cyclohexylamine (boiling point 52–56° C. at 20 mm. Hg pressure) having the structure:

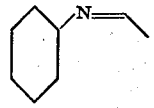

is added as a solution in 20 ml. of diethyl ether. The resulting mass is maintained at approximately 0° C. with the use of an ice bath. After about 15 minutes, the reaction mass is cooled in a Dry Ice-isopropyl alcohol bath and 9.0 ml. propiophenone is added dropwise. The reaction mass is stored overnight at room temperature under a blanket of nitrogen. 150 ml. of water is then added to the reaction mass with stirring yielding a two-phase reaction mass: an aqueous phase and an organic phase. The organic phase is separated and dried over anhydrous sodium sulfate and evaporated down to an orange oil. The said oil is admixed with 50 grams of oxalic acid dissolved in 150 ml. The resulting mixture is steam distilled for a period of two hours. Both the residue and steam distillate are extracted with 200 ml. portions of diethyl ether and the ether extracts are combined, dried over anhydrous sodium sulfate and evaporated down yielding 7.34 grams of an orange oil. This material contains both the cis- and trans-isomers of 3-phenyl-2-pentenal, which are isolated in admixture by means of preparative gas-liquid chromatography.

EXAMPLE IV

18 Grams of the 3-phenyl-2-pentenal produced according to the procedure of Example III is admixed with 16 grams of triethyl orthoformate and a solution formed by adding two drops of acetyl chloride to 115 ml. of anhydrous ethanol in a 250 ml. flask equipped with stirrer, thermometer, and reflux condenser. The reaction mass is stored for a period of two hours and is then decanted. The reaction mass is evaporated down yielding the diethyl acetal of 3-phenyl-2-pentenal.

EXAMPLE V

The following mixture is prepared:

| Ingredients: | Parts |
|---|---|
| 3-Phenyl-4-pentenal dimethyl acetal | 8 |
| 3-Phenyl-3-pentenal dimethyl acetal | 10 |
| Ylang extra | 10 |
| Geraniol coeur | 50 |
| Citronellol coeur | 100 |
| Dimethyl benzyl carbinol | 15 |
| Phenyl ethyl alcohol coeur | 50 |
| Hexyl cinnamic aldehyde | 40 |
| 2-n-heptyl-cyclopentanone | 5 |
| Diels Alder addition product of cyclopentadiene and 3-methyl-3-penten-2-one having the structure 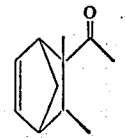 | 30 |
| Myrcenyl acetate | 1 |
| Geranonitrile | 20 |
| Geranyl acetate | 30 |
| Lavender | 20 |
| Nerole | 10 |
| Tetrahydro muguol | 60 |
| 4-(4-methyl, 4-hydroxy amyl) Δ$^3$-cyclohexene carboxaldehyde | 50 |

The 3-phenyl-4-pentenal dimethyl acetal imparts to this green Nasturtian fragrance a green, balsamic, cinnamic-like topnote. The 3-phenyl-3-pentenal dimethyl acetal im-

EXAMPLE VI

The following mixture is prepared:

| Ingredients: | Parts |
|---|---|
| 3-Phenyl-4-pentenal ethylene acetal | 3 |
| 3-Phenyl-4-pentenal diisobutyl acetal | 4 |
| 2-oxa-1,1,3,3-tetramethyl - 2,3,5,6,7,8 - hexahydro-1H-benz(f)-indene | 3 |
| Ylang extra | 5 |
| Geraniol coeur | 100 |
| Citronellol coeur | 70 |
| Dimethyl benzyl carbinol | 20 |
| Phenyl ethyl alcohol coeur | 30 |
| Hexyl cinnamic aldehyde | 30 |
| 2-n-heptyl-cyclopentanone | 2 |
| Diels Alder addition product of cyclopentadiene and 3-methyl-3-penten-2-one having the structure | 20 |

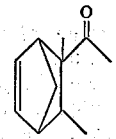

| Linalyl acetate | 30 |
|---|---|
| n. Decanal | 2 |
| Geranonitrile | 30 |
| Orange terpenless | 10 |
| Geranyl acetate | 20 |
| Lavender | 10 |
| Nerole | 10 |
| 4-(4-methyl, 4 - hydroxy amyl)Δ³-cyclohexene carboxaldehyde | 20 |
| Tetrahydro muguol | 40 |
| Mousse de Chene | 3 |

The use of the 3-phenyl-4-pentenal ethylene acetal imparts to the topnote of this green floral fragrance a green, rosy note; and the 3-phenyl-4-pentenal diisobutyl acetal imparts to the body of this fragrance a green, rosy note.

EXAMPLE VII

A tobacco flavoring formulation is prepared by admixing the following ingredients:

| Ingredients: | Parts |
|---|---|
| Cinnamaldehyde | 30.60 |
| Nutmeg oil EI | 0.50 |
| Dibenzyl ether | 3.70 |
| Eugenol | 1.20 |
| Coumarin | 3.00 |
| Vanillin | 1.00 |
| 3-Phenyl-4-pentenal-dimethyl acetal | 60.00 |

This material is added to smoking tobacco at the rate of .06–.15% of the weight of the tobacco.

The use of the 3-phenyl-4-pentenal dimethyl acetal provides to the flavor an excellent cinnamon powder aroma and causes the overall flavor to impart a cinnamon character to tobacco. Without the use of the 3-phenyl-4-pentenal dimethyl acetal cinnamon flavor of this material is bland and lacks body.

EXAMPLE VIII

A tobacco flavoring formulation is prepared by admixing the following ingredients:

| Ingredients: | Parts |
|---|---|
| Bergamot oil Italy | 5.00 |
| Ylang Ylang oil | 1.20 |
| Coumarin | 1.20 |
| Acetophenone | 1.20 |
| Phenyl acetaldehyde | 0.50 |
| Phenyl ethyl isovalerate | 1.00 |
| Methyl heptynyl carbonate | 0.50 |
| 3-Phenyl-4-pentenal-diethyl acetal | 20.00 |
| 95% ethanol | 69.40 |

The foregoing flavor is added to smoking tobacco at the rate of 0.10–0.30% of the weight of tobacco. The use of the 3-phenyl-4-pentenal diethyl acetal in the flavor causes the tobacco to have a hay-clover like flavor with fruity notes.

EXAMPLE IX

The following mixture is prepared:

| Ingredients: | Parts |
|---|---|
| 3-Phenyl-4-pentenal dimethyl acetal produced according to the procedure of Example I | 3 |
| Cinnamic aldehyde | 8 |
| Orange oil | 3 |
| Oil of cloves | 1 |
| Phenyl ethyl alcohol | 5 |
| Ethyl alcohol | 80 |

The addition of the 3-phenyl-4-pentenal dimethyl acetal to this mixture imparts to the flavor a dominating full bodied cinnamon aroma. Without the 3-phenyl-4-pentenal dimethyl acetal, the flavor formulation is bland, lacks body and requires approximately three times as much material when added to the standard cinnamon flavor powders for use in pastry powders and cake powders. The subject flavor formulation acts as an absolute replacement for cinnamon bark, Ceylon (Cortex cinnamoni ceylanici) when used as a flavor in baking. Thus, 420 grams of the above-mentioned flavor formulation are added to the following powder cake flavor oil which is then added at the rate of 0.25% to standard cake mix and appropriately baked:

| | Mixture of Gm. |
|---|---|
| Ethyl vanillin | 27.5 |
| Vanillin | 126.0 |
| Oil of bitter almond | 66.0 |
| Oil of cinnamon bark | 420.0 |
| Oil of cloves | 66.0 |
| Oil of cardamom | 33.0 |
| Oil of nutmeg | 66.0 |
| Oil of lemon, cold pressed | 195.5 |
| Total | 1000.0 |

EXAMPLE X

Preparation of 2-Phenyl-4-Pentenal

Into a 500-liter flask equipped with a stirrer, thermometer, water separator, reflux condenser, heating mantle and addition funnel the following materials are added:

8.8 grams morpholine
250 ml. benzene
12.0 grams phenylacetaldehyde

The mixture is refluxed with water separation until no more water is produced from the reaction mixture (period of time: four hours). The benzene is then evaporated leaving a yellow solid which is then dissolved in 200 ml. acetonitrile. The acetonitrile acts as a solvent.

The resulting enamine reaction product having the structure:

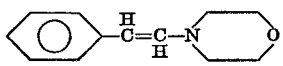

dissolved in acetonitrile is then admixed with 9.0 ml. of allyl chloride. 0.25 Grams of KI (solid) is added and the reaction mixture is then refluxed with stirring for a period of 12 hours. The acetonitrile solvent is then removed by means of adding the reaction mixture to a rotary evaporator. The reaction mass which now contains the immonium salt having the structure:

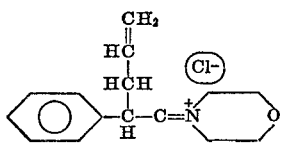

is placed in a 500-ml. three-neck flask equipped with stirrer, thermometer and reflux condenser. 300 ml. of 1.5 M aqueous hydrochloric acid is added and the reaction mass is stirred for a period of three hours. The reaction mass is then placed in a one liter separatory funnel and extracted with three 200 ml. portions of diethyl ether. The diethyl ether is washed successively with 200 ml. portions of water and saturated sodium carbonate. The resulting ether extract is then dried over anhydrous sodium sulfate and evaporated thereby yielding a residual red oil. This red oil is rushed over at 0.2 ml. mercury pressure yielding 1.70 grams of yellow oil. This material is then passed through a 10' x 3/8" SE-30 GLC column, IR, mass spectral and NMR analysis confirm the structure of this material as 2-phenyl-4-pentenal.

The NMR data for this compound is as follows:

| P.p.m. | | | Interpretation |
|---|---|---|---|
| 9.65 | (d) | 1H | Formyl proton. |
| 7.62–7.08 | (m) | 5H | Aryl protons. |
| 5.87–5.46 | (m) | 1H | Olefinic proton. |
| 5.06–4.88 | (m) | 2H | Olefinic protons. |
| 3.54 | (t) | 1H | $\text{Aryl}-\underset{H}{\overset{HC=O}{C}}-CH_2-$ |
| 2.92–2.28 | (m) | 2H | $\text{Aryl}-C-\underline{CH_2}-C=C$ |

EXAMPLE XI

Preparation of 2-Phenyl-4-Pentenal Dimethyl Acetal

300 Mg. of 2-phenyl-4-pentenal produced in Example X is dissolved in 10 ml. of methanol and 0.5 grams of 2,2-dimethoxy propane. One drop of acetyl chloride is added to the reaction mixture and the mixture is maintained at 25° C. for five hours. The solvent is then evaporated and the resulting residue is taken up in 20 ml. of petroleum ether. Petroleum ether solution is filtered to remove a small amount of white solid and is then evaporated down leaving a residue which is a light yellow oil. The light yellow oil is determined to have a purity greater than 97% by means of gas liquid chromatography and is determined by means of IR, NMR and mass spectral analysis to be 2-phenyl-4-pentenal dimethyl acetal.

The NMR data for this compound is as follows:

| P.p.m. | | | Interpretation |
|---|---|---|---|
| 7.20 | (m) | 5H | Aromatic protons. |
| 5.80–5.40 | (m) | 1H | Olefinic proton. |
| 5.00–4.80 | (m) | 2H | Olefinic protons. |
| 4.40 | (d) | 1H | Acetal proton. |
| 3.24 | (s) | 3H | $CH_3O-$ |
| 3.20 | (s) | 3H | $CH_3O-$ |
| 2.92 | (m) | 1H | Benzylic proton. |
| 2.50 | (m) | 2H | $\text{Aryl}-C-\underline{CH_2}-C=C$ |

EXAMPLE XII

2-Phenyl-4-pentenal dimethyl acetal is added directly to a food product prior to processing and canning. The following illustrates the beneficial flavor effect when 2-phenyl-4-pentenal dimethyl acetal is added directly to several food products just prior to their consumption.

(i) In tomato soup at 10–20 p.p.m.: creates a distinctive flavor characteristic in the product; has an aroma characterized as sweet, green, vegetable; raw carrot, cooked tomato and turnip-like.

(ii) In blended vegetable sauce at approximately 30 p.p.m.: brings up turnip and raw carrot notes but depresses celery note and blends flavor in a desirable manner thereby providing an increase in turnip and cooked tomato flavor.

(iii) In vegetable soup at 40 p.p.m.: imparts a fresh vegetable flavor; the turnip and raw carrot and cooked tomato notes give the entire vegetable flavor a very full body.

(iv) In bean tomato sauce at approximately 20 p.p.m.: modifies the flavor by reducing the harsh character of the tomato spice mixture while at the same time adding turnip and raw carrot notes and developing the typical cooked tomato note.

The levels of concentration of the 2-phenyl-4-pentenal dimethyl acetal may be reduced by 25% when 2-isobutyl thiazole is added at the rate of 5 p.p.b. in addition to the 2-phenyl-4-pentenal dimethyl acetal to the various products set forth above. It should be understood further that noticeable differences in the flavor are discernible at other concentrations. At much higher levels, the flavor becomes objectionable and overly rancid tasting (e.g. 200–300 p.p.m.).

EXAMPLE XIII

Preparation of 3-Phenyl-4-Pentenal Diethyl Acetal

Into a 25 ml. flask equipped with thermometer, magnetic stirrer and reflux condenser, the following materials are added:

| | | |
|---|---|---|
| 3-phenyl-4-pentenal | grams | 4.80 |
| Triethyl orthoformate | do | 6.00 |
| Absolute ethanol having dissolved therein hydrogen chloride (produced by adding 0.1 ml. acetyl chloride to 10 ml. of absolute ethanol) | ml | 10 |

The mixture warms spontaneously within 5 minutes. After stirring for one hour the volatile materials are then evaporated and the residual material is distilled yielding 5.88 grams of a colorless material boiling at 68–70% at 0.1 mm. Hg pressure. NMR, IR and mass spectral analysis indicate that this material is 97% 3-phenyl-4-pentenal diethyl acetal.

The NMR data for this compound is as follows:

| P.p.m. | | | Interpretation |
|---|---|---|---|
| 7.35–7.14 | (m) | 5H | Aromatic protons. |
| 6.12–5.78 | (m) | 1H | Olefinic proton. |
| 5.10–4.96 | (m) | 2H | Olefinic protons. |
| 4.33 | (t) | 1H | Acetal proton. |
| 3.75–3.32 | (m) | 4H | Protons alpha to oxygen. |
| 2.00 | (t) | 2H | $\text{Aryl}-\underset{H}{\overset{H}{C}}-\underline{CH_2}-C$ |
| 1.16 | (t) | 3H | $CH_3-CH_2-O$ |
| 1.12 | (t) | 3H | $CH_3-CH_2-O$ |

EXAMPLE XIV

Preparation of 3-Phenyl-4-Pentenal Ethylene Acetal

Into a 100-ml. flask equipped with thermometer, water separator, stirrer and reflux condenser, the following materials are added:

| | | |
|---|---|---|
| 3-phenyl-4-pentenal | grams | 8.00 |
| Ethylene glycol | do | 5.00 |
| Benzene | ml | 40 |
| Paratoluene sulfonic acid | grams | 0.5 |

The reaction mixture is refluxed until water is no longer evolved therefrom (one hour). The reaction mixture is then transferred to a 250 ml. separatory funnel and the heavier phase is discarded. The benzene phase is then washed with three 100 ml. portions of saturated sodium bicarbonate. The resulting solution is then dried over anhydrous sodium sulfate and evaporated until a colorless oil residue is obtained. This residue is evaporated at 0.04 mm. Hg pressure at a temperature of 79–83° C. yielding 5.51 grams of product. The product is confirmed by IR, NMR and mass spectral analysis as 3-phenyl-4-pentenal ethylene acetal having the structure:

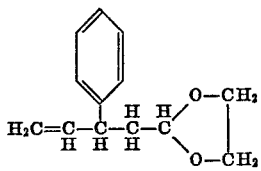

The NMR data for this compound is as follows:

| P.p.m. | | | Interpretation |
|---|---|---|---|
| 7.24 | (m) | 5H | Aryl protons. |
| 6.26–5.80 | (m) | 1H | Olefinic proton. |
| 5.14–4.98 | (m) | 2H | Olefinic protons. |
| 4.72 | (t) | 1H | Acetal proton. |
| 4.00–3.74 | (m) | 4H | O—CH$_2$—CH$_2$—O— |
| 2.08 and 1.98 | (2 doublets) | 2H | Aryl-C—CH$_2$—C—O— |

EXAMPLE XV

Preparation of 3-Phenyl-4-Pentenal Diisobutyl Acetal

Into a 25 ml. flask equipped with magnetic stirrer, thermometer, reflux condenser and water separator, the following materials are placed:

| | | |
|---|---|---|
| 3-phenyl-4-pentenal | grams | 8.00 |
| Isobutyl alcohol | do | 16.00 |
| Anhydrous benzene | ml | 25 |
| Paratoluene sulfonic acid | grams | 0.2 |

The reaction mass is then refluxed while water is being removed for a period of 15 minutes. The refluxing continues for a period of one additional hour. The resulting solution is then washed with 100 ml. of saturated sodium carbonate solution and dried over anhydrous sodium sulfate. The benzene is evaporated and the residual colorless oil is distilled at 110° C. (0.10–0.15 mm. Hg pressure) providing 6.66 grams of product having a purity greater than 95%. NMR, IR and mass spectral analysis yield the information that the product is 3-phenyl-4-pentenal diisobutyl acetal.

The NMR data for this compound is as follows:

| P.p.m. | | | Interpretation |
|---|---|---|---|
| 7.22 | (m) | 5H | Aryl protons. |
| 6.14–5.80 | (m) | 1H | Olefinic proton. |
| 5.12–4.96 | (m) | 2H | Olefinic protons. |
| 4.34 | (t) | 1H | Acetal proton. |
| 3.58–3.00 | (m) | 5H | Protons alpha to oxygen and in addition aryl—$\overset{H}{\underset{}{C}}$—C— |
| 2.02 | (t) | 2H | Aryl—C—CH$_2$— |
| 2.00 | (m) | 2H | C\\C—/H /C |
| 0.93 and 0.85 | (2 doublets) | 12H | CH$_3$\\C—/CH$_3$ |

It will be understood by those skilled in the art from the foregoing description that the 2- or 3-phenyl-pentenals lower alkyl and lower alkylene acetals can be used in the preparation of a wide variety of flavor and fragrance compositions. The acetals prepared according to the several examples can be used in a manner similar to those shown in the various flavoring, perfume and tobacco examples.

What is claimed is:

1. An acetal having the structure:

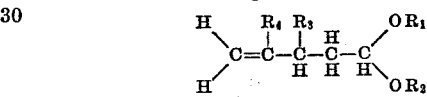

wherein $R_1$ and $R_2$ are the same and are selected from the group consisting of methyl and ethyl and wherein one of $R_3$ or $R_4$ is phenyl and the other of $R_3$ or $R_4$ is hydrogen.

2. 3-Phenyl-4-pentenal dimethyl acetal.
3. 3-Phenyl-4-pentenal diethyl acetal.
4. 2-Phenyl-4-pentenal dimethyl acetal.

References Cited

UNITED STATES PATENTS 3,582,360   6/1971   Van Praag et al. _____ 260—599

OTHER REFERENCES

Moncrieff: *The Chemistry of Perfumery Materials,* 1949, United Trade Press Ltd., London, pp. 62–5.

Deux: "Chemical Abstracts," vol. 37, 1943, col. 1995[5] and col. 3415[3].

Hill et al.: "Tetrahedron Letters," No. 15, 1967, pp. 1421–3.

Cresson: "Bull. Soc. Chim. France," No. 10, 1964, pp. 2618–35.

DONALD G. DAVIS, Primary Examiner

J. H. TURNIPSEED, Assistant Examiner

U.S. Cl. X.R.

99—103, 105, 140; 252—522; 260—240 R, 338, 340.7, 340.9, 586 R, 599

UNITED STATES PATENT AND TRADEMARK OFFICE
CERTIFICATE OF CORRECTION

PATENT NO. : 3,829,504
DATED : August 13, 1974
INVENTOR(S) : JOHN B. HALL and MANFRED HUGO VOCK It is certified that error appears in the above—identified patent and that said Letters Patent are hereby corrected as shown below:

Column 22, Line 30, Claim 1: change the structure:

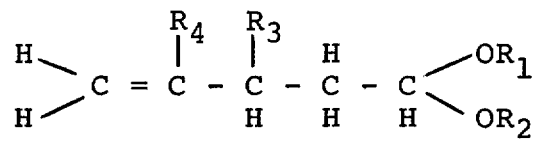

to the following structure:

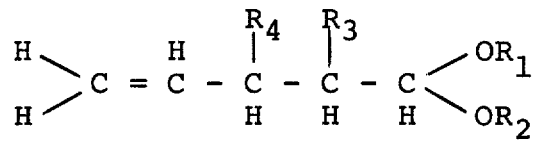

Signed and Sealed this

Eighth Day of February 1977

[SEAL]

Attest:

RUTH C. MASON
Attesting Officer

C. MARSHALL DANN
Commissioner of Patents and Trademarks